(12) United States Patent
Nishimura

(10) Patent No.: US 7,215,116 B2
(45) Date of Patent: May 8, 2007

(54) VARIABLE RELUCTANCE TYPE ANGLE DETECTOR

(75) Inventor: Shinji Nishimura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/271,826

(22) Filed: Nov. 14, 2005

(65) Prior Publication Data

US 2006/0119352 A1    Jun. 8, 2006

(30) Foreign Application Priority Data

Nov. 17, 2004   (JP)   ............... 2004-333749

(51) Int. Cl.
*G01B 7/30*   (2006.01)
(52) U.S. Cl. ............... 324/207.25; 324/207.18
(58) Field of Classification Search ........... 324/207.25, 324/207.18
See application file for complete search history.

(56) References Cited

U.S. PATENT DOCUMENTS 5,691,590 A * 11/1997 Kawai et al. ............... 310/180

FOREIGN PATENT DOCUMENTS

JP    08-178611 B2    7/1996

\* cited by examiner

*Primary Examiner*—Reena Aurora
(74) *Attorney, Agent, or Firm*—Sughrue Mion, PLLC

(57) ABSTRACT

Provided is a variable reluctance type angle detector whose exciting winding resistance can be reduced to increase an exciting current without an increase in exciting power source voltage, thereby reducing an influence caused by a noise. The variable reluctance type angle detector includes: a stator including a plurality of teeth (2) inwardly formed at intervals in a circumferential direction, exciting coils (5) excited by a power source, and a-phase output coils (6) for outputting a change in magnetic flux as a voltage, the exciting coils (5) and the a-phase output coils (6) being formed in the teeth (2) by winding a wire on each of the teeth; and a rotor (4) including an iron core having a shape in which a gap permeance between the iron core and the stator (3) is sinusoidally changed, in which the exciting coils (5) formed in the teeth (2) which are different from one another are connected in series in a circumferential direction to produce a plurality of exciting coil groups and the exciting coil groups are connected in parallel to form an exciting winding (9).

5 Claims, 13 Drawing Sheets

| teeth number | 2(1) | 2(2) | 2(3) | 2(4) | 2(5) | 2(6) | 2(7) | 2(8) | 2(9) | 2(10) | 2(11) | 2(12) |
|---|---|---|---|---|---|---|---|---|---|---|---|---|
| first exciting coil group 7 | 20 | -20 | 20 | -20 | 20 | -20 | 20 | -20 | 20 | -20 | 20 | -20 |
| second exciting coil group 8 | 20 | -20 | 20 | -20 | 20 | -20 | 20 | -20 | 20 | -20 | 20 | -20 |
| output winding 10(s) | 13 | 48 | 35 | -13 | -48 | -35 | 13 | 48 | 35 | -13 | -48 | -35 |
| output winding 10(c) | 48 | 13 | -35 | -48 | -13 | 35 | 48 | 13 | -35 | -48 | -13 | 35 |

| teeth number | 2(1) | 2(2) | 2(3) | 2(4) | 2(5) | 2(6) | 2(7) | 2(8) | 2(9) | 2(10) | 2(11) | 2(12) |
|---|---|---|---|---|---|---|---|---|---|---|---|---|
| first exciting coil group 7 | 40 | — | 40 | — | 40 | — | 40 | — | 40 | — | 40 | — |
| second exciting coil group 8 | — | −40 | — | −40 | — | −40 | — | −40 | — | −40 | — | −40 |
| output winding 10(s) | 13 | 48 | 35 | −13 | −48 | −35 | 13 | 48 | 35 | −13 | −48 | −35 |
| output winding 10(c) | 48 | 13 | −35 | −48 | −13 | 35 | 48 | 13 | −35 | −48 | −13 | 35 |

| teeth number | 2(1) | 2(2) | 2(3) | 2(4) | 2(5) | 2(6) | 2(7) | 2(8) | 2(9) | 2(10) | 2(11) | 2(12) |
|---|---|---|---|---|---|---|---|---|---|---|---|---|
| first exciting coil group 7 | 40 | - | 40 | - | 40 | - | 40 | - | 40 | - | 40 | - |
| second exciting coil group 8 | - | -40 | - | -40 | - | -40 | - | -40 | - | -40 | - | -40 |
| first output coil group 11(s) | 13 | - | 35 | - | -48 | - | 13 | - | 35 | - | -48 | - |
| second output coil group 12(s) | - | 48 | - | -13 | - | -35 | - | 48 | - | -13 | - | -35 |
| first output coil group 11(c) | 48 | - | -35 | - | -13 | - | 48 | - | -35 | - | -13 | - |
| second output coil group 12(c) | - | 13 | - | -48 | - | 35 | - | 13 | - | -48 | - | 35 |

| teeth number | 2(1) | 2(2) | 2(3) | 2(4) | 2(5) | 2(6) | 2(7) | 2(8) | 2(9) | 2(10) | 2(11) | 2(12) |
|---|---|---|---|---|---|---|---|---|---|---|---|---|
| first exciting coil group 7 | 40 | - | 40 | - | 40 | - | 40 | - | 40 | - | 40 | - |
| second exciting coil group 8 | - | -40 | - | -40 | - | -40 | - | -40 | - | -40 | - | -40 |
| first output coil group 11(s) | 13 | 48 | 35 | - | - | - | 13 | 48 | 35 | - | - | - |
| second output coil group 12(s) | - | | - | -13 | -48 | -35 | - | - | - | -13 | -48 | -35 |
| first output coil group 11(c) | - | - | -35 | -48 | -13 | - | | - | -35 | -48 | -13 | - |
| second output coil group 12(c) | 48 | 13 | - | - | - | 35 | 48 | 13 | - | - | - | 35 |

FIG.16

| teeth number | 2(1) | 2(2) | 2(3) | 2(4) | 2(5) | 2(6) | 2(7) | 2(8) | 2(9) | 2(10) | 2(11) | 2(12) |
|---|---|---|---|---|---|---|---|---|---|---|---|---|
| exciting winding 9 | 20 | -20 | 20 | -20 | 20 | -20 | 20 | -20 | 20 | -20 | 20 | -20 |
| output winding 10(s) | 13 | 48 | 35 | -13 | -48 | -35 | 13 | 48 | 35 | -13 | -48 | -35 |
| output winding 10(c) | 48 | 13 | -35 | -48 | -13 | 35 | 48 | 13 | -35 | -48 | -13 | 35 |
| short-circuit windings 14(1) | 10 | - | - | - | - | - | -10 | - | - | - | - | - |
| short-circuit windings 14(2) | - | 10 | - | - | - | - | - | -10 | - | - | - | - |
| short-circuit windings 14(3) | - | - | 10 | - | - | - | - | - | -10 | - | - | - |
| short-circuit windings 14(4) | - | - | - | 10 | - | - | - | - | - | -10 | - | - |
| short-circuit windings 14(5) | - | - | - | - | 10 | - | - | - | - | - | -10 | - |
| short-circuit windings 14(6) | - | - | - | - | - | 10 | - | - | - | - | - | -10 |

FIG.18

| teeth number | 2(1) | 2(2) | 2(3) | 2(4) | 2(5) | 2(6) | 2(7) | 2(8) | 2(9) | 2(10) | 2(11) | 2(12) |
|---|---|---|---|---|---|---|---|---|---|---|---|---|
| exciting winding 9 | 20 | -20 | 20 | -20 | 20 | -20 | 20 | -20 | 20 | -20 | 20 | -20 |
| output winding 10(s) | 13 | 48 | 35 | -13 | -48 | -35 | 13 | 48 | 35 | -13 | -48 | -35 |
| output winding 10(c) | 48 | 13 | -35 | -48 | -13 | 35 | 48 | 13 | -35 | -48 | -13 | 35 |
| short-circuit windings 14(1) | 10 | 10 | - | - | - | - | -10 | -10 | - | - | - | - |
| short-circuit windings 14(2) | - | - | 10 | 10 | - | - | - | - | -10 | -10 | - | - |
| short-circuit windings 14(3) | - | - | - | - | 10 | 10 | - | - | - | - | -10 | -10 |

VARIABLE RELUCTANCE TYPE ANGLE DETECTOR

BACKGROUND OF THE INVENTION

1. Field of the Invention

The present invention relates to a variable reluctance type angle detector for detecting a rotation angle of a motor or the like.

2. Description of the Related Art

A conventional variable reluctance type angle detector includes a stator in which an exciting winding and n-phase output windings are provided in slots and an iron core having a shape in which a gap permeance between the iron core and the stator is sinusoidally changed corresponding to an angle $\theta$.

In order to form the exciting winding, all exciting coils in which wires are wound in a winding direction which is alternately changed to a normal direction or a reverse direction in each of the slots, are connected in series such that the number of poles of the exciting winding is equal to the number of teeth (the number of slots) of the stator.

In order to form the output windings, output coils in which wires are wound are connected in series such that a voltage induced in the output winding of one phase is sinusoidally distributed.

When a sinusoidal voltage is applied to the exciting coils in the above-mentioned structure, a sinusoidal current flows into the exciting coils, thereby generating magnetic fluxes in the teeth.

A magnetic flux density of each of the teeth is determined based on a gap permeance between each of teeth of the stator and a rotor. Therefore, an output voltage is produced in each of the output windings as a composite value of magnetic fluxes which cross the output coils wound on the respective teeth.

The gap permeance is changed according to a rotational position of the rotor, so an amplitude of the output voltage changes. Therefore, the angle of the rotor can be obtained from the amplitude of the output voltage (see, for example, JP 3182493 B).

For example, when the conventional variable reluctance type angle detector is attached to a motor driven by an inverter, a noise caused by switching of the inverter is induced to an output winding of the conventional variable reluctance type angle detector, thereby deteriorating the detection precision of the rotational angle.

In order to reduce the noise, it is expected that an exciting ampere-turn is increased to increase an amplitude of a signal component from the output winding. However, a power source is shared with another device, so an exciting power source voltage is limited, with the result that the exciting ampere-turn cannot be freely increased.

Even when an exciting current can be increased, a current density of an exciting coil increases, so that the exciting coil is likely to overheat.

SUMMARY OF THE INVENTION

The present invention has been made to solve the above-mentioned problems. An object of the present invention is to provide a variable reluctance type angle detector whose exciting winding resistance can be reduced to increase an exciting current without an increase in exciting power source voltage, thereby reducing an influence caused by a noise.

According to the present invention, there is provided a variable reluctance type angle detector including: a stator including a plurality of teeth inwardly formed at intervals in a circumferential direction, exciting coils excited by a power source, and a-phase output coils for outputting a change in magnetic flux as a voltage, the exciting coils and the a-phase output coils being formed in the teeth by winding a wire on each of the teeth; and a rotor including an iron core having a shape in which a gap permeance between the iron core and the stator is sinusoidally changed, in which the exciting coils formed in the teeth which are different from one another are connected in series in a circumferential direction to produce a plurality of exciting coil groups and the exciting coil groups are connected in parallel to form an exciting winding.

According to the a rotational angle detecting device in the present invention, the exciting coil groups are connected in parallel to reduce a resistance of the exciting winding, so that an exciting current flowing through the entire exciting winding can be increased without an increase in exciting power source voltage. Therefore, it is possible to obtain a variable reluctance type angle detector in which the influence of a noise is reduced and detection precision is high.

A current flowing through each of the exciting coils does not change, so the exciting winding can be prevented from being heated.

BRIEF DESCRIPTION OF THE DRAWINGS

In the accompanying drawings:

FIG. 16 is an explanatory diagram showing the number of wire turns of an exciting coil, the number of wire turns of an output coil, and the number of wire turns of a short-circuit coil in the variable reluctance type angle detector shown in FIG. 15;

FIG. 18 is an explanatory diagram showing the number of wire turns of an exciting coil, the number of wire turns of an output coil, and the number of wire turns of a short-circuit coil in the variable reluctance type angle detector shown in FIG. 17.

DETAILED DESCRIPTION OF THE PREFERRED EMBODIMENTS

Figure 1:
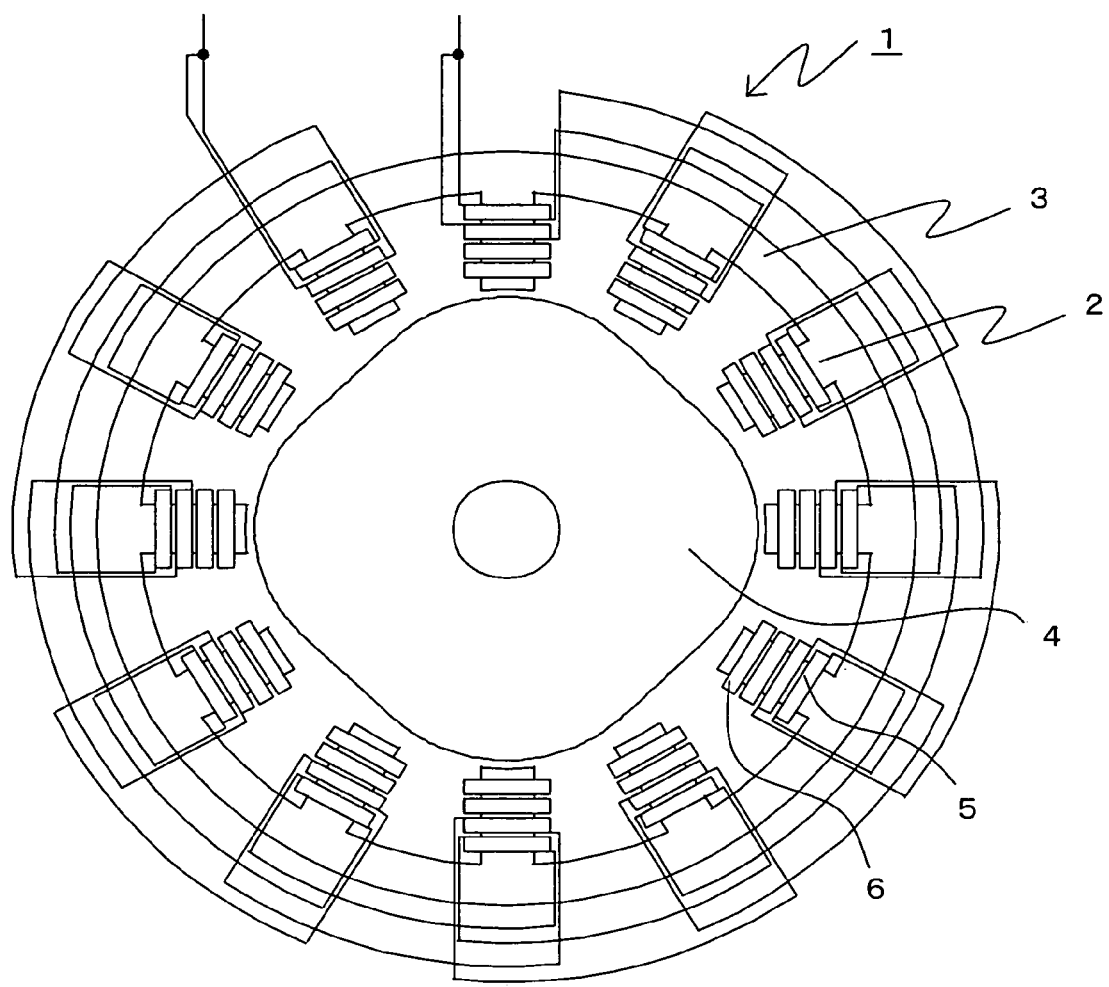
FIG. 1 is a structural view showing a variable reluctance type angle detector according to Embodiment 1 of the present invention.

Hereinafter, respective embodiments of the present invention will be described with reference to the accompany drawings. In the respective drawings, the same reference numerals are provided for the same or corresponding members (or portions).

Embodiment 1

FIG. 1 is a structural view showing a variable reluctance type angle detector according to Embodiment 1 of the present invention. An example in which the number of teeth is 12 and the number of salient poles of a rotor is 4 is shown in FIG. 1.

Figures 2, 3:
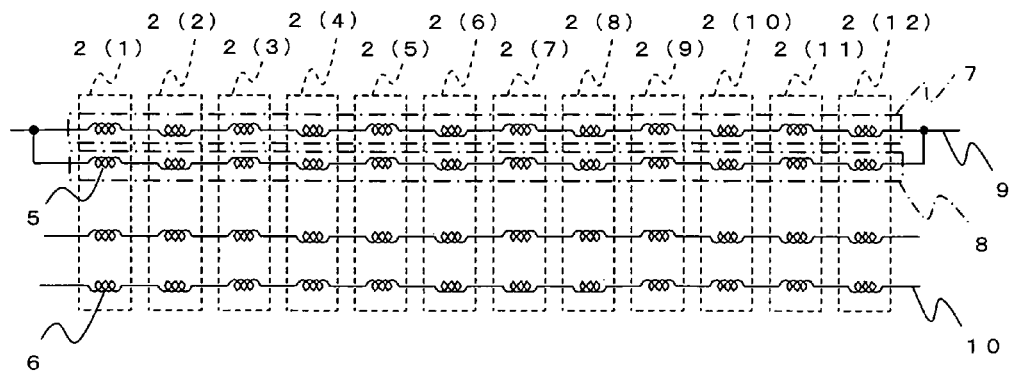
FIG. 2 is a connection diagram showing a connection state of coils shown in FIG. 1.
FIG. 3 is an explanatory diagram showing the number of wire turns of an exciting coil and the number of wire turns of an output coil, which are shown in FIG. 1.

FIG. 2 is a connection diagram showing a connection state of coils shown in FIG. 1. A vertical orientation of each of the coils is indicated corresponding to a normal winding direction or a reverse winding direction.

In FIGS. 1 and 2, a variable reluctance type angle detector 1 includes a stator 3 having teeth 2 inwardly arranged in a circumferential direction and a rotor 4 composed of an iron core having a shape in which a gap permeance between the iron core and the stator 3 is sinusoidally changed.

Exciting coils 5 and an output coil 6, in each of which a wire is wound are formed in each of the teeth 2 of the stator 3.

Two exciting coils 5 are formed in each of the teeth 2. The wires for the adjacent exciting coils 5 arranged in the circumferential direction are wound on the corresponding teeth 2 such that the number of turns of each of the wires is the same and the winding directions are reversed to each other.

The teeth 2 are expressed clockwise from the top one of the teeth 2 as teeth 2(1), 2(2), . . . , and 2(12), respectively.

A j-th exciting coil 5 counted from an outside to an inner diameter side in the tooth 2(i) is expressed as a coil 5(i, j).

A first exciting coil group 7 includes exciting coils 5(1, 1), 5(2, 1), . . . , and 5(12, 1) which are formed in the teeth 2(1), 2(2), . . . , and 2(12) and connected in series in the circumferential direction.

A second exciting coil group 8 includes exciting coils 5(1, 2), 5(2, 2), . . . , and 5(12, 2) which are connected in series in the circumferential direction.

A first winding coil of the first exciting coil group 7 is connected to a first winding coil of the second exciting coil group 8. A last winding coil of the first exciting coil group 7 is connected to a last winding coil of the second exciting coil group 8. Therefore, the first exciting coil group 7 and the second exciting coil group 8 are connected in parallel to form an exciting winding 9.

In FIG. 2, the exciting coils 5(1, 1), 5(2, 1), . . . , and 5(12, 1) and 5(1, 2), 5(2, 2), . . . , and 5(12, 2) are not shown and they are shown as the exciting coils 5.

The number of wire turn of the output coils 6 of an output winding 10 will be described with reference to an example of two-phase output (s-phase and c-phase). Assume that the number of pairs of poles which is a spatial order of magnetomotive forces generated by the exciting coils 5 is expressed by M (here, M=6 because the wires are alternately normally and reversely wound on twelve teeth 2) and the number of salient poles of the rotor 4 is expressed by N. Then, the number of wire turns (ns(i) and nc(i)) of the respective phases in the tooth 2(i) can be expressed by the following expressions (1) and (2).

$$ns(i) = K\sin\left((N-M)\frac{2\pi}{Ns}i + \alpha\right) \quad (1)$$

$$nc(i) = K\cos\left((N-M)\frac{2\pi}{Ns}i + \alpha\right) \quad (2)$$

where K indicates an arbitrary number, Ns indicates of the number of teeth of the stator, and α indicates an arbitrary number.

The output coil 6 of the output winding 10 of a q-phase in a tooth 2(p) is expressed as an output coil 6(p, q) and the output winding 10 of the q-phase is expressed as an output winding 10(q).

An s-phase output winding 10(s) includes output coils 6(1, 1), 6(2, 1), . . . , and 6(12, 1) which are formed in the respective teeth 2 and connected in series in the circumferential direction.

A c-phase output winding 10(c) includes the output coils 6(1, 1), 6(2, 1), . . . , and 6(12, 1) which are formed in the respective teeth 2 and connected in series in the circumferential direction.

In FIG. 2, the output coils 6(1, 1), 6(2, 1), . . . , and 6(12, 1) are not shown and they are shown as the output coils 6.

FIG. 3 shows an example with respect to the number of wire turns of each of the exciting coils 5 included in the exciting winding 9 and the number of wire turns of each of the output coils 6 included in the output winding 10.

In FIG. 3, when the number of wire turns has a negative sign, the winding direction is the reverse direction.

Hereinafter, the operation of the variable reluctance type angle detector 1 having the above-mentioned structure will be described.

When a sinusoidal voltage is applied to the exciting winding 9, a sinusoidal current flows into the exciting winding 9. When the sinusoidal current flows into the exciting winding 9, magnetic fluxes are generated in the teeth 2.

The magnetic flux generated in each of the teeth 2 is determined based on a gap permeance between each of teeth 2 of the stator 3 and the rotor 4. Therefore, an output voltage is produced in the output winding 10 as a composite value of magnetic fluxes which cross the output coils 6 wound on the respective teeth 2.

The gap permeance is changed according to a rotational position of the rotor 4, so an amplitude of the output voltage changes. Therefore, the angle of the rotor 4 can be obtained from the amplitude of the output voltage.

Because the exciting winding 9 includes the first exciting coil group 7 and the second exciting coil group 8 which are connected in parallel, a resistance of the exciting winding 9 can be reduced as compared with the case where the exciting winding 9 includes a single exciting coil group.

Therefore, even when the same exciting power source voltage is set, a large exciting current can be obtained. When the exciting current becomes larger, a magnetomotive force for generating the magnetic flux increases, so the output voltage of the output winding 10 becomes higher.

According to the variable reluctance type angle detector 1 in Embodiment 1 of the present invention, the first exciting coil group 7 and the second exciting coil group 8 are connected in parallel to form the exciting winding 9, so the resistance of the exciting winding 9 can be reduced.

Thus, the output voltage of the output winding 10 can be increased without an increase in exciting power source voltage. Because the output voltage becomes larger, it is possible to reduce the influence of a noise.

A current flowing through each of the exciting coils 5 is not changed, so the exciting winding 9 can be prevented from being heated.

The case where the output wiring 10 has two phases is described above. Here, assume that the output wiring 10 has three phases, for example, a u-phase, a v-phase, and a w-phase. Then, with respect to the number of wire turns of each of the exciting coils 6, the number of turns (ns(i) and nc(i)) of the wires wound on the tooth 2(*i*) in the respective phases can be expressed by the following expressions (3) to (5).

$$nu(i) = K\sin\left((N-M)\frac{2\pi}{Ns}i + \alpha\right) \quad (3)$$

$$nv(i) = K\sin\left((N-M)\frac{2\pi}{Ns}i + \alpha + \frac{2}{3}\pi\right) \quad (4)$$

$$nw(i) = K\sin\left((N-M)\frac{2\pi}{Ns}i + \alpha + \frac{4}{3}\pi\right) \quad (5)$$

where K indicates an arbitrary number, Ns indicates the number of teeth of the stator, and α indicates an arbitrary number.

When the output wiring 10 has "a" phases (the number of phases "a" is an even number), the number of wire turns of the output coil 6(*i*, *j*) can be expressed by the following expression (6). When the number of phases "a" is an odd number, the number of wire turns of the output coil 6(*i*, *j*) can be expressed by the following expression (7).

$$n(i) = K\sin\left((N-M)\frac{2\pi}{Ns}i + \alpha + \frac{\pi}{a}j\right) \quad (6)$$

$$n(i) = K\sin\left((N-M)\frac{2\pi}{Ns}i + \alpha + \frac{2\pi}{a}j\right) \quad (7)$$

where K indicates an arbitrary number, Ns indicates the number of teeth of the stator, "a" indicates the number of phases of the output coil, j indicates a j-th phase, and α indicates an arbitrary number.

Embodiment 2

Figure 4:
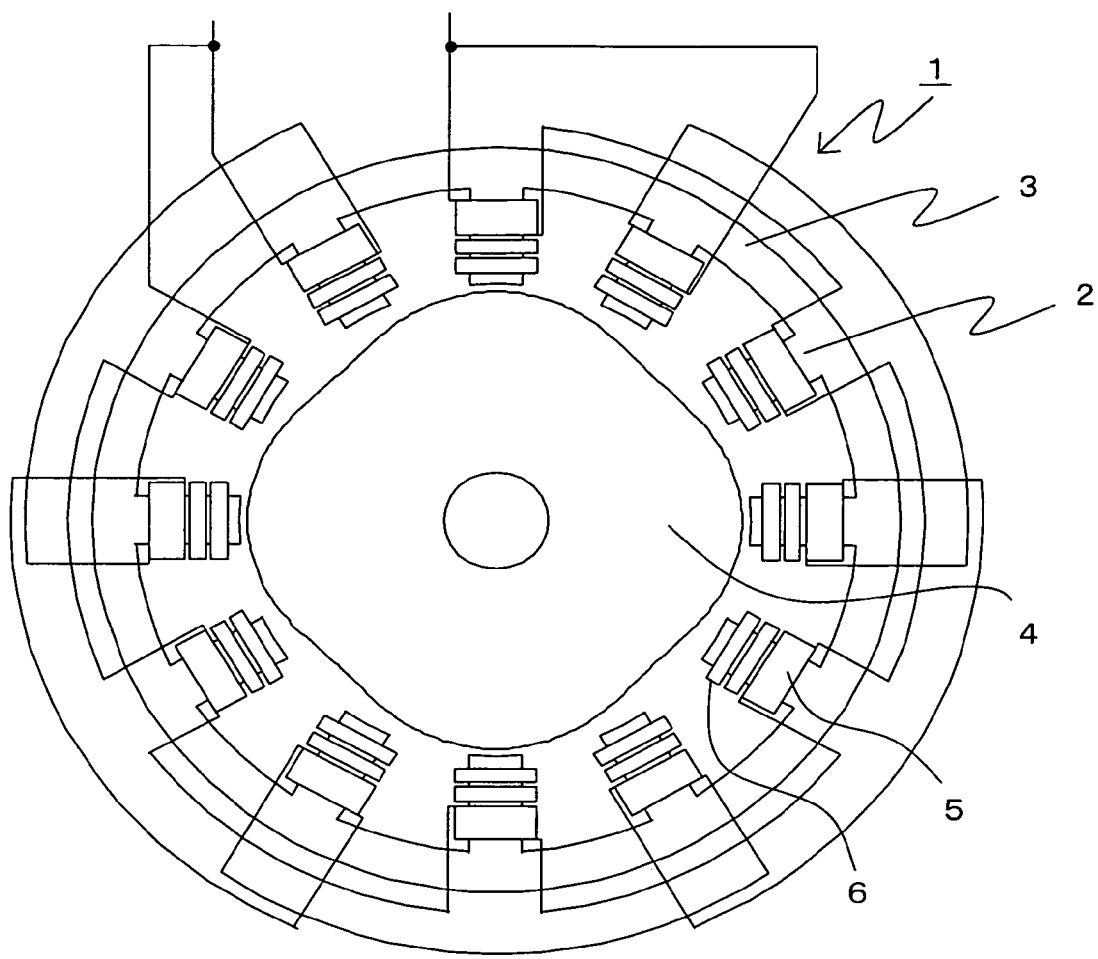
FIG. 4 is a structural view showing a variable reluctance type angle detector according to Embodiment 2 of the present invention.

FIG. 4 is a structural view showing the variable reluctance type angle detector 1 according to Embodiment 2 of the present invention. An example in which the number of teeth 2 is 12 and the number of salient poles of the rotor 4 is shown in FIG. 4.

Figures 5, 6:
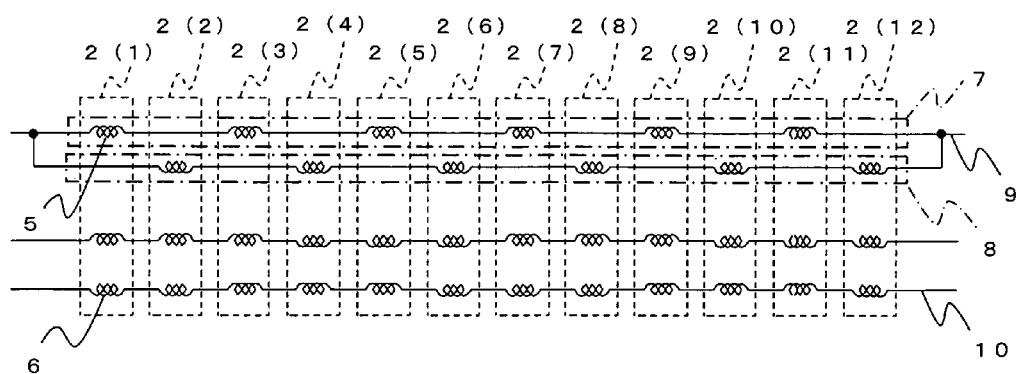
FIG. 5 is a connection diagram showing a connection state of coils shown in FIG. 4.
FIG. 6 is an explanatory diagram showing the number of wire turns of an exciting coil and the number of wire turns of an output coil, which are shown in FIG. 4.

FIG. 5 is a connection diagram showing a connection state of coils shown in FIG. 4. A vertical orientation of each of the coils is indicated corresponding to the normal winding direction or the reverse winding direction.

In FIGS. 4 and 5, the single exciting coil 5 is formed in each of the teeth 2. The wires for the adjacent exciting coils 5 arranged in the circumferential direction are wound on the corresponding teeth 2 such that the numbers of turns of each of the wires are the same and the winding directions are reversed to each other.

A first exciting coil group 7 includes the exciting coils 5 which are formed in the odd teeth 2(1), 2(3), . . . , and 2(11) and connected in series in the circumferential direction.

A second exciting coil group 8 includes the exciting coils 5 which are formed in the even teeth 2(2), 2(4), . . . , and 2(12) and connected in series in the circumferential direction.

A first winding coil of the first exciting coil group 7 is connected to a first winding coil of the second exciting coil group 8. A last winding coil of the first exciting coil group 7 is connected to a last winding coil of the second exciting coil group 8. Therefore, the exciting winding 9 is formed in which the first exciting coil group 7 and the second exciting coil group 8 are connected in parallel.

The output winding 10 is the same as that shown in Embodiment 1, so a description thereof is omitted.

FIG. 6 shows an example with respect to the number of wire turns of each of the exciting coils 5 included in the exciting winding 9 and the number of wire turns of each of the output coils 6 included in the output winding 10.

In FIG. 6, when the number of wire turns has a negative sign, the winding direction is the reverse direction. A column in which only "-" is indicated means that the exciting coil 5 is not formed in the corresponding tooth 2.

Hereinafter, the operation of the variable reluctance type angle detector 1 having the above-mentioned structure will be described.

Because the exciting winding 9 includes the first exciting coil group 7 and the second exciting coil group 8 which are connected in parallel, the number of exciting coils 5 connected in series is halved as compared with the case where the exciting winding 9 includes a single exciting coil group, so that the resistance of the exciting winding 9 can be reduced.

Therefore, even when the same exciting power source voltage is set, a large exciting current can be obtained. When the exciting current becomes larger, a magnetomotive force for generating the magnetic flux increases, so the output voltage of the output winding 10 becomes higher.

The exciting coils 5 of the first exciting coil group 7 and the exciting coils 5 of the second exciting coil group 8 are formed in the teeth 2 which are different from one another. The first exciting coil group 7 and the second exciting coil group 8 are connected in parallel to produce a loop.

Therefore, for example, when a variation in magnetic flux occurs in a diameter direction of the exciting winding 9, a circulating current flows into the exciting winding 9 in the direction in which the variation in magnetic flux is cancelled.

According to the variable reluctance type angle detector 1 in Embodiment 2 of the present invention, the exciting coils 5 of the first exciting coil group 7 and the exciting coils 5 of the second exciting coil group 8 are formed in the teeth 2 which are different from one another. The first exciting coil group 7 and the second exciting coil group 8 are connected in parallel to produce a loop.

Therefore, for example, when a variation in high-frequency magnetic flux passing through the exciting winding 9 in a diameter direction thereof is caused by switching of an inverter or the like, a circulating current flows into the exciting winding 9 in the direction in which the variation in magnetic flux is cancelled. Thus, the influence of the variation in magnetic flux which crosses the output winding 10 can be reduced to perform high-precision angle detection.

In the above-description, the wires for the adjacent exciting coils 5 arranged in the circumferential direction are wound such that the numbers of turns of each of the wires are the same and the winding directions are reversed to each other. The first winding coil of the first exciting coil group 7 is connected to the first winding coil of the second exciting coil group 8. The last winding coil of the first exciting coil group 7 is connected to the last winding coil of the second exciting coil group 8. Therefore the first exciting coil group 7 and the second exciting coil group 8 are connected in parallel to form the exciting winding 9.

The following structure may be used. The wires for all the exciting coils 5 are wound in the same direction. The first winding coil of the first exciting coil group 7 is connected to the last winding coil of the second exciting coil group 8. The first winding coil of the second exciting coil group 8 is connected to the last winding coil of the first exciting coil group 7. Therefore, the first exciting coil group 7 and the second exciting coil group 8 are connected in parallel to form the exciting winding 9.

Figure 7:
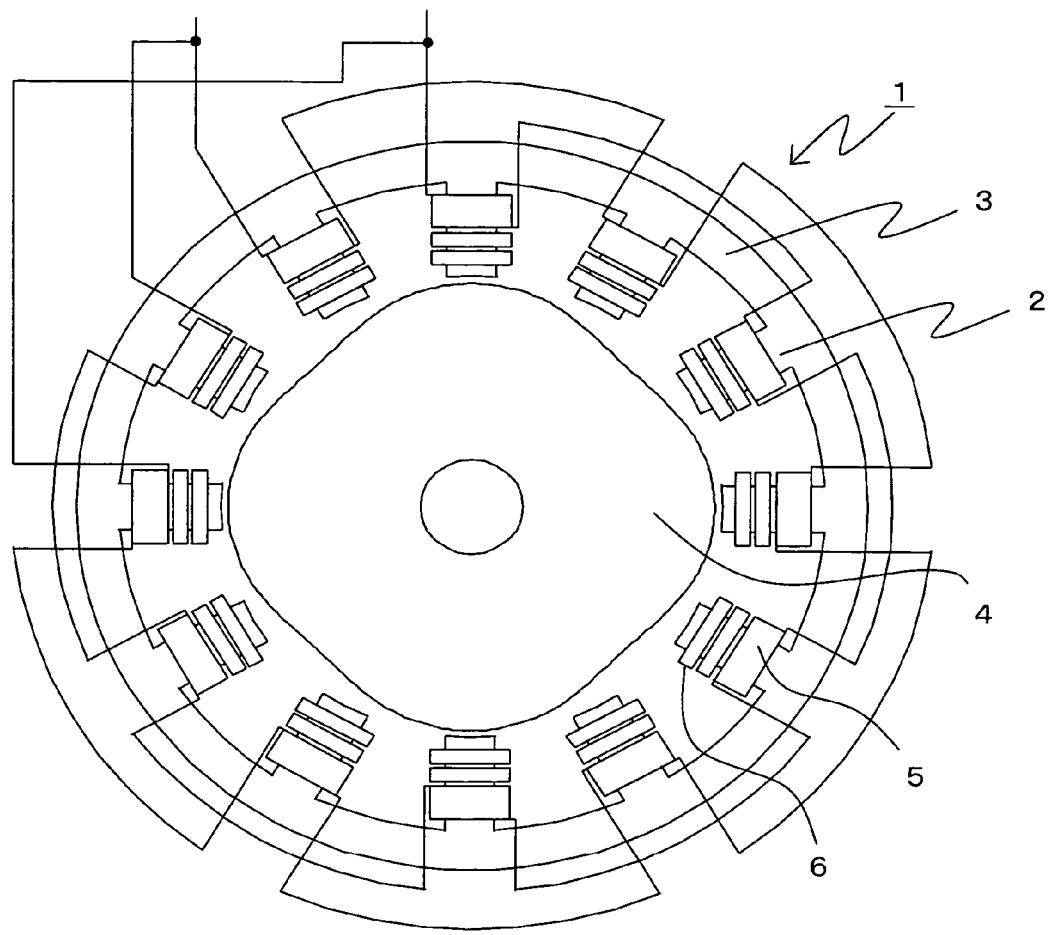
FIG. 7 is a structural view showing another example of the variable reluctance type angle detector according to Embodiment 2 of the present invention.
Figure 8:
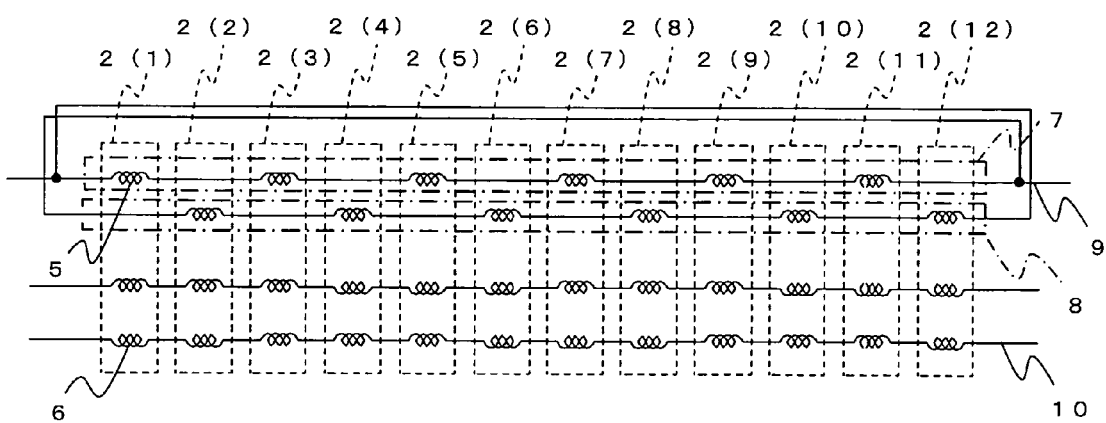
FIG. 8 is a connection diagram showing a connection state of coils shown in FIG. 7.

FIGS. 7 and 8 are a structural view showing the variable reluctance type angle detector 1 and a connection diagram showing a connection state of the respective coils in such a case.

Hereinafter, a specific method of forming the actual exciting winding 9 will be described.

First, 40 turns of wire are wound on the tooth 2(1). Then, 40 turns of wire are wound on the tooth 2(3). Similarly, 40 turns of wire are wound on alternate teeth 2 until the wire is wound on the tooth 2(11).

Subsequently, the wire is extended to the tooth 2(2) and 40 turns of wire are wound on the tooth 2(2) in the same direction. Then, 40 turns of wire are wound on the tooth 2(4) in the same direction. Similarly, 40 turns of wire are wound on alternate teeth 2 until the wire is wound on the tooth 2(12).

Even when the exciting winding 9 formed as described above is used, it is possible to obtain the same effect as that of this embodiment. The wire for each of the exciting coils 5 can be wound in the same direction, so workability can be improved.

Embodiment 3

Figure 9:
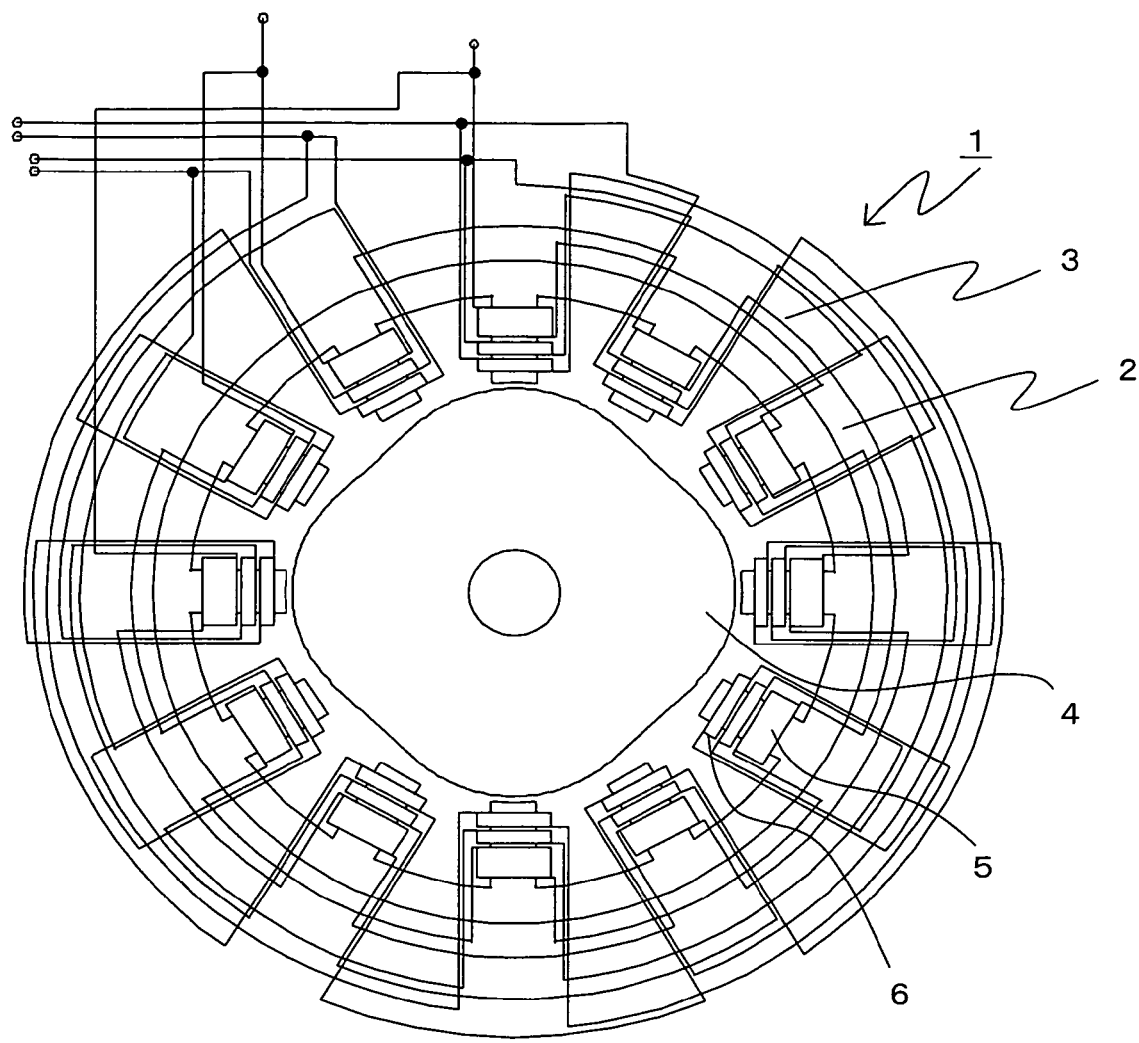
FIG. 9 is a structural view showing a variable reluctance type angle detector according to Embodiment 3 of the present invention.

FIG. 9 is a structural view showing the variable reluctance type angle detector 1 according to Embodiment 3 of the present invention. An example in which the number of teeth 2 is 12 and the number of salient poles of the rotor 4 is shown in FIG. 9.

Figures 10, 11:
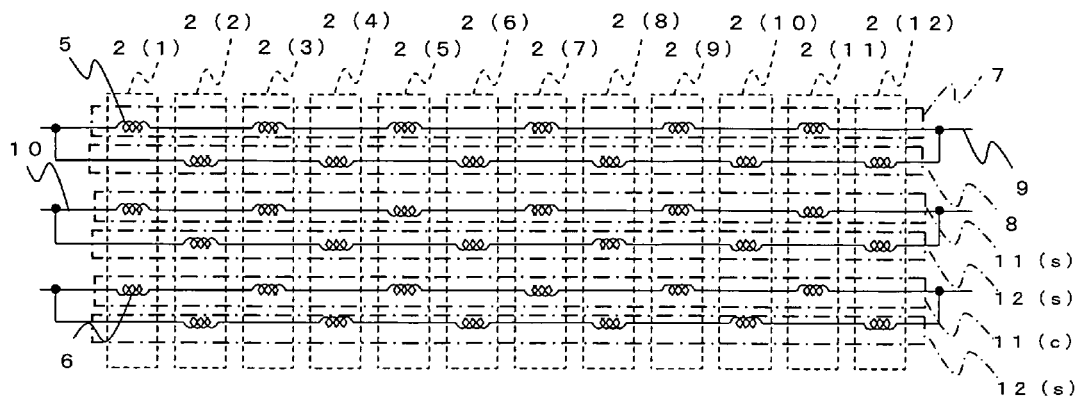
FIG. 10 is a connection diagram showing a connection state of coils shown in FIG. 9.
FIG. 11 is an explanatory diagram showing the number of wire turns of an exciting coil and the number of wire turns of an output coil, which are shown in FIG. 9.

FIG. 10 is a connection diagram showing a connection state of coils shown in FIG. 9. A vertical orientation of each of the coils is indicated corresponding to the normal winding direction or the reverse winding direction.

In FIGS. 9 and 10, the exciting winding 9 is identical to that in Embodiment 2 and thus a description thereof is omitted here.

The output winding 10 of each phase includes the output coils 6 each having the number of wire turns equal to that of each of the output coils 6 described in Embodiment 2. As in the case of the connection of the exciting winding 9 described in Embodiment 2, the output winding 10 of each phase includes a first output coil group 11 and a second output coil group 12 which are connected in parallel. The first output coil group 11 includes the output coils 6 which are formed in the odd teeth 2 and connected in series. The second output coil group 12 includes the output coils 6 which are formed in the even teeth 2 and connected in series.

The output winding 10 of s-phase will be described.

The first output coil group 11 and the second output coil group 12 which are included in an output winding 10($q$) are expressed as a first output coil group 11($q$) and a second output coil group 12($q$), respectively.

A first output coil group 11(1) includes the output coils 6 which are formed in the odd teeth 2(1), 2(3), ..., and 2(11) and connected in series in the circumferential direction.

A second output coil group 12(1) includes the output coils 6 which are formed in the even teeth 2(2), 2(4), ..., and 2(12) and connected in series in the circumferential direction.

A first winding coil of the first output coil group 11(1) is connected to a first winding coil of the second output coil group 12(1). A last winding coil of the first output coil group 11(1) is connected to a last winding coil of the second output coil group 12(1). Therefore, the first output coil group 11(1) and the second output coil group 12(1) are connected in parallel to form the output winding 10 of s-phase.

FIG. 11 shows an example with respect to the number of wire turns of each of the exciting coils 5 included in the exciting winding 9 and the number of wire turns of each of the output coils 6 included in the output winding 10.

In FIG. 11, when the number of wire turns has a negative sign, the winding direction is the reverse direction. A column in which only "-" is indicated means that the exciting coil 5 and the output coil 6 are not formed in the corresponding tooth 2.

Hereinafter, the operation of the variable reluctance type angle detector 1 having the above-mentioned structure will be described.

The output coils 6 of the first output coil group 11(1) and the output coils 6 of the second output coil group 12(1) are formed in the teeth 2 which are different from one another. The first output coil group 11(1) and the second output coil group 12(1) are connected in parallel to produce a loop.

Therefore, for example, when a variation in magnetic flux occurs in a diameter direction of the output winding 10, a circulating current flows into the output winding 10 in the direction in which the variation in magnetic flux is cancelled.

According to the variable reluctance type angle detector 1 in Embodiment 3 of the present invention, the output coils 6 of the first output coil group 11 and the output coils 6 of the second output coil group 12 are formed in the teeth 2 which are different from one another. The first output coil group 11 and the second output coil group 12 are connected in parallel to produce a loop.

Therefore, for example, when a variation in high-frequency magnetic flux passing through the output winding 10 in a diameter direction thereof is caused by switching of an inverter or the like, a circulating current flows into the output winding 10 in the direction in which the variation in magnetic flux is cancelled. Thus, the influence of the variation in magnetic flux which crosses the output winding 10 can be reduced to perform high-precision angle detection.

In the above-description, the output coils 6 of the first output coil group 11(1) include output coils whose winding directions are the normal direction and output coils whose winding directions are the reverse direction. However, as described in Embodiment 2, the following structure may be used. The wires for all the output coils 6 are wound in the same direction. The first winding coil of the first output coil group 11(1) is connected to the last winding coil of the second output coil group 12(1). The first winding coil of the second output coil group 12(1) is connected to the last winding coil of the first output coil group 11(1). Therefore, the first output coil group 11(1) and the second output coil group 12(1) are connected in parallel to form the output winding 10.

Figures 12, 13:
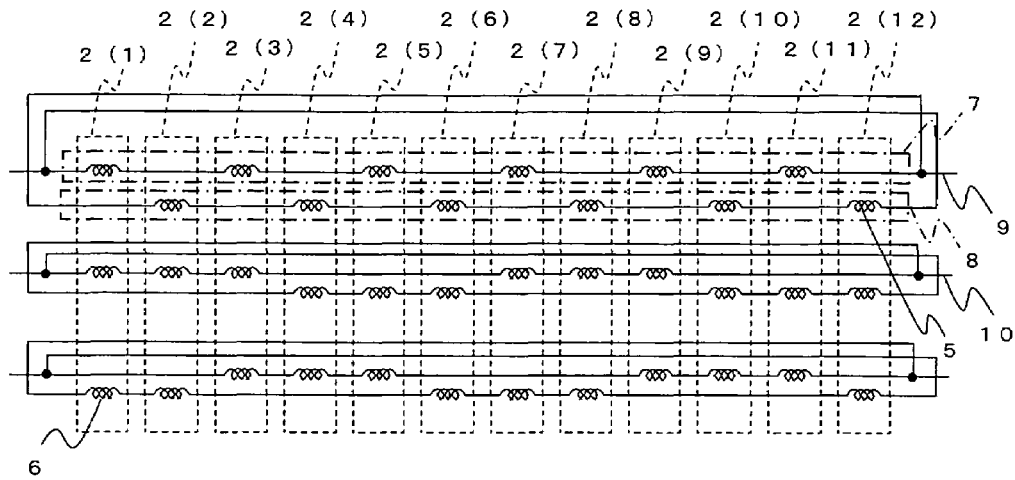
FIG. 12 is a connection diagram showing another connection state of coils in the variable reluctance type angle detector according to Embodiment 3 of the present invention.
FIG. 13 is an explanatory diagram showing the number of wire turns of an exciting coil and the number of wire turns of an output coil in the variable reluctance type angle detector shown in FIG. 12.

FIG. 12 is a connection diagram showing a connection state of respective coils of the variable reluctance type angle detector 1 in such a case. A vertical orientation of each of the coils is indicated corresponding to the normal winding direction or the reverse winding direction.

FIG. 13 shows an example with respect to the number of wire turns of each of the exciting coils 5 included in the exciting winding 9 and the number of wire turns of each of the output coils 6 included in the output winding 10. In FIG. 13, when the number of wire turns has a negative sign, the winding direction is the reverse direction. A column in which only "-" is indicated means that the exciting coil 5 and the output coil 6 are not formed in the corresponding tooth 2.

Even when the output winding 10 formed as described above is used, it is possible to obtain the same effect as that of this embodiment.

The wire for each of the output coils 6 can be wound in the same direction, so workability can be improved.

Embodiment 4

Figure 14:
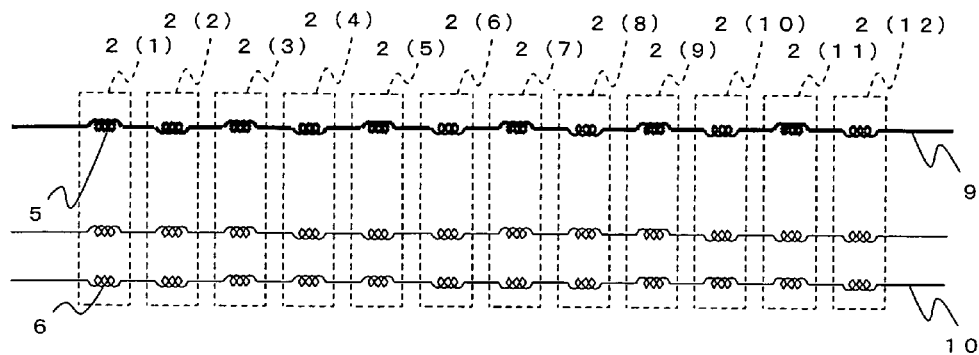
FIG. 14 is a connection diagram showing a variable reluctance type angle detector according to Embodiment 4 of the present invention.

FIG. 14 is a connection diagram showing a connection state of coils of the variable reluctance type angle detector 1 according to Embodiment 4 of the present invention.

The exciting winding 9 includes the output coils 6 connected in series in which a wire having a wire diameter larger than that of a wire used for the output winding 10 is wound on each of the teeth 2.

The output winding 10 may be the same as that described in Embodiment 1.

Because the wire having the large wire diameter is used for the exciting winding 9, a sectional area thereof becomes larger, so that the resistance of the exciting winding 9 can be reduced.

Therefore, even when the same exciting power source voltage is set, a large exciting current can be obtained. When the exciting current becomes larger, a magnetomotive force for generating the magnetic flux increases, so the output voltage of the output winding 10 becomes higher.

According to the variable reluctance type angle detector 1 in Embodiment 4 of the present invention, the wire having the large wire diameter is used for the exciting winding 9, so the resistance thereof becomes smaller. Therefore, even when the same exciting voltage is set, the exciting current increases, so that the output voltage of the output winding 10 can be increased.

The wire diameter of the wire used for the output winding 10 is small, so a sufficient winding space can be obtained.

Embodiment 5

Figure 15:
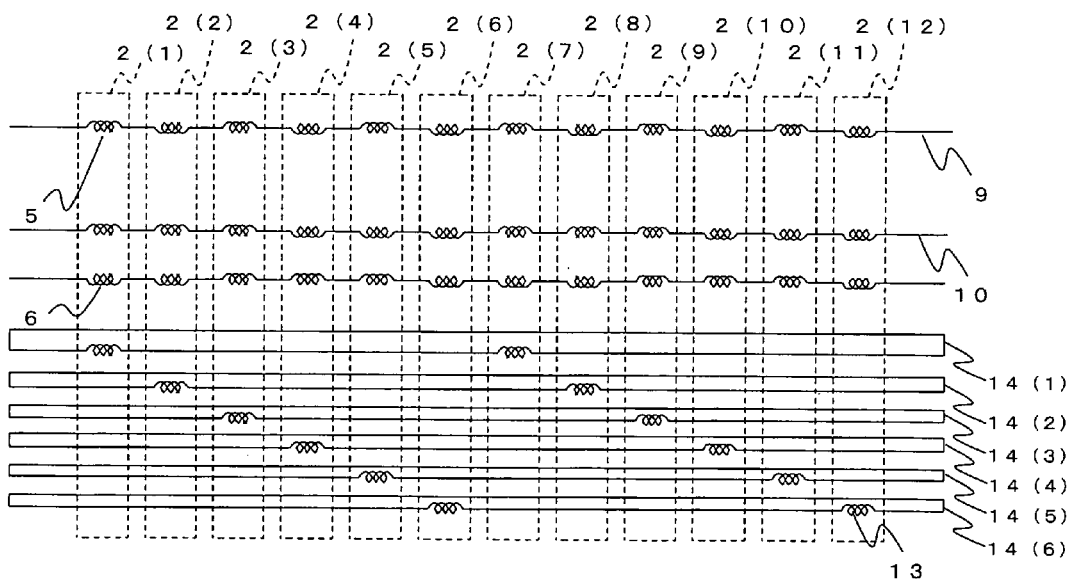
FIG. 15 is a connection diagram showing a connection state of coils in a variable reluctance type angle detector according to Embodiment 5 of the present invention.

FIG. 15 is a connection diagram showing a connection state of coils of the variable reluctance type angle detector 1 according to Embodiment 5 of the present invention.

The wires for the adjacent exciting coils 5 arranged in the circumferential direction are wound such that the numbers of turns of each of the wires are the same and the winding directions are reversed to each other. All the exciting coils 5 are connected in series to form the exciting winding 9.

The output winding 10 is identical to that in Embodiment 1 and thus a description thereof is omitted here.

Short-circuit coils 13 in which wires are wound in the same winding direction are formed in the respective teeth 2.

A short-circuit coil 13 formed in one of the teeth 2 is connected to a short-circuit coil 13 formed in another one of the teeth 2 which is point-symmetric to the short-circuit coil 13 formed in the one of the teeth 2 with respect to an axis point of the rotor 4. Subsequently, such connection is made to form six short-circuit windings 14.

Hereinafter, a specific method of forming a short-circuit winding 14(1) will be described. Note that an r-th short-circuit winding 14 is expressed as a short-circuit winding 14(r).

First, 10 turns of wire are wound on the tooth 2(1) in the normal direction to form one of the short-circuit coils 13.

Subsequently, the wire is extended to the tooth 2(7) which is point-symmetric with respect to the axis point of the rotor 4. Then, 10 turns of wire are wound on the tooth 2(7) in the reverse direction to form another one of the short-circuit coils 13.

Then, a winding start portion of the wire is connected to a winding end portion thereof to form the short-circuit winding 14(1).

As in the case of the short-circuit winding 14(1), in order to form each of the short-circuit winding 14(2) and the other short-circuit windings, wires are wound on the teeth 2 which are point-symmetric to each other such that the numbers of turns of each of the wires are the same and the winding directions are reversed to each other, thereby forming short-circuit coils 13. The formed short-circuit coils 13 are connected to each other.

FIG. 16 shows an example with respect to the number of wire turns of each of the exciting coils 5 included in the exciting winding 9, the number of wire turns of each of the output coils 6 included in the output winding 10, and the number of wire turns of each of the short-circuit coils 13 included in the short-circuit winding 14. In FIG. 16, when the number of wire turns has a negative sign, the winding direction is the reverse direction. A column in which only "-" is indicated means that the short-circuit coil 13 is not formed in the corresponding tooth 2.

Hereinafter, the operation of the variable reluctance type angle detector 1 having the above-mentioned structure will be described.

The short-circuit coil 13 formed in the tooth 2(p) is expressed as a short-circuit coil 13(p).

In the short-circuit winding 14(1), the winding direction of a wire for a short-circuit coil 13(1) is reverse to that for a short-circuit coil 13(7).

Then, when a current flows into the exciting winding 9, an electromotive force generated in the short-circuit coil 13(1) becomes reverse to that in the short-circuit coil 13(7) because the wire for the exciting coil 5(1, 1) is wound in the normal direction and the wire for the exciting coil 5(7, 1) is wound in the normal direction. Therefore, a short-circuit current does not flow.

Here, it is assumed that an air gap between the stator 3 and the rotor 4 becomes unevenness. For example, it is assumed that the stator 3 or the rotor 4 is decentered and thus an air gap between the tooth 2(1) and the rotor 4 becomes smaller and an air gap between the tooth 2(7) and the rotor 4 becomes larger. In such a case, an amplitude of a flowing exciting-current in the tooth 2(1) is equal to that in the tooth 2(7), so a magnetic flux density of the tooth 2(1) in which the air gap is small becomes larger.

As a result, the electromotive force generated in the short-circuit coil 13(1) of the short-circuit winding 14(1) becomes larger than that in the short-circuit coil 13(7) of the short-circuit winding 14(1). Therefore, a short-circuit current flows into the short-circuit coil 13(1) in the direction in which the magnetic flux of the tooth 2(1) is cancelled and a short-circuit current flows into the short-circuit coil 13(7) in the direction in which the magnetic flux of the tooth 2(7) is increased.

For example, even when a variation in magnetic flux occurs in the diameter direction of the exciting winding 9, a circulating current flows into the short-circuit windings 14 which are connected in parallel in the direction in which the variation in magnetic flux is cancelled.

The operation of each of the second to sixth short-circuit windings 14 is performed as described above.

According to the variable reluctance type angle detector 1 in Embodiment 5 of the present invention, when there is a magnetic flux passing through the teeth 2 in the diameter direction, for example, a magnetic flux passing from the tooth 2(1) to the tooth 2(7), the direction of the electromotive force generated in the short-circuit coil 13(1) is aligned with that in the short-circuit coil 13(7). Therefore, the short-circuit currents flow into the short-circuit coils 13 in the direction in which the magnetic flux is reduced.

Thus, the influence of a noise on the output coils 6 can be suppressed by the reduction in magnetic flux, thereby performing high-precision angle detection.

In this embodiment, each of the short-circuit windings 14 is formed by the connection between the short-circuit coils 13 provided in the teeth 2 which are opposed to each other. Another connecting method may be used.

Figure 17:
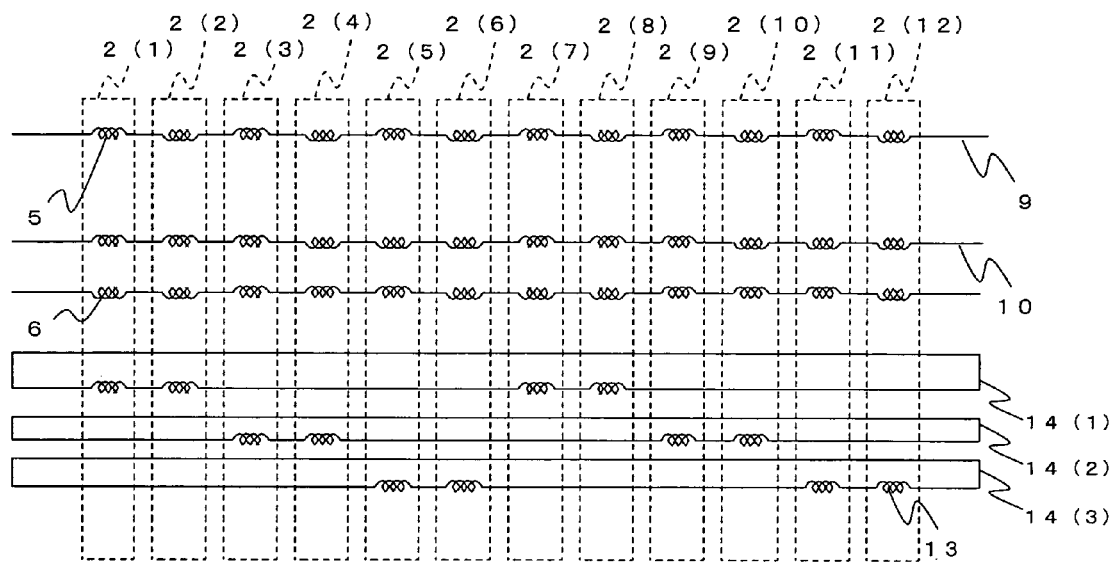
FIG. 17 is a connection diagram showing another connection state of coils in the variable reluctance type angle detector according to Embodiment 5 of the present invention.

FIG. 17 is a connection diagram showing a connection state of the short-circuit coils 13 provided by another connecting method.

FIG. 18 shows an example with respect to the number of wire turns of each of the exciting coils 5 included in the exciting winding 9, the number of wire turns of each of the output coils 6 included in the output winding 10, and the number of wire turns of each of the short-circuit coils 13 included in the short-circuit winding 14.

When the short-circuit coils 13 are formed in such a manner, the number of connecting points of the short-circuit windings 14 is reduced, so workability is higher than that in the case where the six short-circuit windings 14 are provided.

With respect to each of the exciting winding 9, a signal winding, and the short-circuit winding 14, the number of wire turns and the winding direction are examples and thus not limited to those described in the above-mentioned embodiments.

In the above description, the rotor 4 is provided inside the stator 3. The stator 3 having the teeth 2 may be provided outside the rotor 4.

What is claimed is:

1. A variable reluctance type angle detector, comprising:
    a stator including a plurality of teeth formed at intervals in a circumferential direction, exciting coils excited by a power source, and "a"-phase output coils for outputting a change in magnetic flux as a voltage, the exciting coils and the "a"-phase output coils being formed in the teeth by winding a wire on each of the teeth, wherein "a" is an integer representing a number of phases of the output coils; and
    a rotor including an iron core having a shape in which a gap permeance between the iron core and the stator is sinusoidally changed,
    wherein the exciting coils formed in separate ones of the teeth are connected in series in a circumferential direction to produce a plurality of exciting coil groups and the exciting coil groups are connected in parallel to form an exciting winding.

2. A variable reluctance type angle detector according to claim 1, wherein the exciting coils are formed by winding a wire having a wire diameter equal to that of a wire for the "a"-phase output coils.

3. A variable reluctance type angle detector according to claim 1, wherein the exciting coils of each of the exciting coil groups are formed in the teeth which are different from one another.

4. A variable reluctance type angle detector according to claim 1, wherein the exciting winding includes: a first exciting coil group of the plurality of exciting coil groups in which half of the exciting coils formed in the teeth are connected; and a second exciting coil group of the plurality of exciting coil groups in which remaining half of the exciting coils formed in the teeth are connected, the first exciting coil group being connected to the second exciting coil group.

5. A variable reluctance type angle detector according to claim 4, wherein the first exciting coil group includes exciting coils of the exciting coils which are formed in alternate teeth of the teeth in the circumferential direction, which are connected, and
    the second exciting coil group includes exciting coils of the exciting coils which are formed in remaining teeth of the teeth, which are connected.

* * * * *